United States Patent [19]

Moffatt et al.

[11] Patent Number: 5,919,293
[45] Date of Patent: Jul. 6, 1999

[54] USE OF PERFLUORINATED COMPOUNDS AS A VEHICLE COMPONENT IN INK-JET INKS

[75] Inventors: John R. Moffatt; Tim A. Beerling, both of Corvallis; David A. Neel, Albany, all of Oreg.

[73] Assignee: Hewlett-Packard Company, Palo Alto, Calif.

[21] Appl. No.: 08/961,609

[22] Filed: Oct. 31, 1997

[51] Int. Cl.$^6$ .................................................... C09D 11/02
[52] U.S. Cl. ................................. 106/31.57; 106/31.58; 106/31.45; 106/31.85; 106/31.86; 106/31.75
[58] Field of Search ............................. 106/31.57, 31.58, 106/31.45, 31.85, 31.86, 31.75

[56] References Cited

U.S. PATENT DOCUMENTS

| | | | |
|---|---|---|---|
| 3,948,668 | 4/1976 | Hayek et al. | 106/31.59 |
| 4,880,565 | 11/1989 | Rose et al. | 106/31.43 |
| 5,019,166 | 5/1991 | Schwarz | 106/31.43 |
| 5,401,303 | 3/1995 | Stoffel et al. | 106/31.75 |
| 5,690,722 | 11/1997 | Pawlowski | 106/31.58 |
| 5,766,325 | 6/1998 | Gundlach et al. | 106/31.43 |
| 5,766,326 | 6/1998 | Gundlach et al. | 106/31.43 |
| 5,769,929 | 6/1998 | Gundlach et al. | 106/31.43 |
| 5,772,743 | 6/1998 | Gundlach et al. | 106/31.43 |
| 5,772,744 | 6/1998 | Gundlach et al. | 106/31.43 |
| 5,776,230 | 7/1998 | Gundlach et al. | 106/31.43 |
| 5,788,750 | 8/1998 | Gundlach et al. | 106/31.43 |

OTHER PUBLICATIONS

Christian Reichardt, "Solvents and Solvent Effects in Organic Chemistry", VCH Publishers, pp. 285–338 (1988), No Month Available.

*Primary Examiner*—Helene Klemanski

[57] ABSTRACT

An ink-jet ink composition and a method for printing are provided which involve the use of at least one perfluorinated solvent as part or all of the vehicle of the ink-jet ink. The ink-jet ink composition evidences improved bleed control, reduced paper cockle and curl, and reduced dry time upon printing onto a print medium. The use of perfluorinated solvents reduces or even eliminates material compatibility issues between the ink and the materials comprising the pen from which the ink is ejected.

31 Claims, No Drawings

USE OF PERFLUORINATED COMPOUNDS AS A VEHICLE COMPONENT IN INK-JET INKS

TECHNICAL FIELD

The present invention relates to ink compositions employed in ink-jet printing, especially in thermal ink-jet printing, and, more particularly, to the partial or total use of perfluorinated compounds as a vehicle component in ink-jet inks to minimize a number of problems associated with more conventional vehicle components.

BACKGROUND ART

Ink-jet printing is a non-impact printing process in which droplets of ink are deposited on print media, such as paper, transparency film, or textiles. Low cost and high quality of output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two common means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through orifices associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Many inks that are described for use in ink-jet printing are associated with non-thermal ink-jet printing, such as piezoelectric ink-jet printing. Inks suitably employed in such non-thermal applications often cannot be used in thermal ink-jet printing due to the effect of heating on the ink composition.

In commercially-available thermal ink-jet color printers, such as a DeskJet® printer available from Hewlett-Packard Company, a color spectrum is achieved by combining cyan, magenta, and yellow inks in various proportions. Ink-jet inks are mostly available as dye-based compositions, although a number of black pigment-based ink-jet inks are also available. Thus, cyan, magenta, and yellow inks typically derive their hues from cyan, magenta, and yellow or pigments, and/or macromolecular complexes, respectively. (A macromolecular complex, or MMC, is formed by suitable chemical modification of the pigment surface so as to render the pigment essentially totally water-soluble.) The particular set of inks, each comprising one or more vehicle components and one or more colorants (dyes or pigments or MMCs), constitutes a so-called "ink set". Color printers typically employ a four-pen set containing cyan, magenta, and yellow inks as well as a black ink, which is typically used for printing text.

The dye-based color ink-jet inks are typically formulated by dissolving dye in an aqueous-based ink vehicle. The dyes employed in ink-jet ink compositions are often in the form of dye salts made of a dye anion and a cation such as sodium, lithium, tetramethylammonium, etc. These dyes are designed to form solids in the target paper substrate by absorption into paper media by at least two mechanisms. In one mechanism the dye is wicked into the paper and absorbed onto active sites of the paper fiber. There is another mechanism operating in which the ink vehicle evaporates, or is wicked away from the dye, leaving solid dye on the paper fibers.

The pigment-based color ink-jet inks are typically formulated by forming a dispersion of the pigment in an aqueous-based vehicle, employing a dispersing agent. Alternatively, the pigment may be chemically treated in some fashion such that it essentially acts like a macromolecular complex, described above. In yet another approach, a microemulsion may be formed by combining a pigment, a macromolecular complex, a water-soluble dye or water-insoluble dye, with a surfactant and water.

Many of the components used in ink-jet inks, whether the colorant is a dye or a pigment or an MMC, are reactive with one or more of the pen components (e.g., resistor pad, nozzle plate, firing chamber material, and the like), which, over time, causes degradation of the component and ultimately of pen performance. Specific components that may react include water and solvents, such as organic compounds, used in the vehicle of the ink.

Further, interaction between the ink-jet ink solvents and the print medium (e.g., paper) can result in cockle and curling problems of the paper. While solutions to these problems have been effective, it is preferable to avoid the problem altogether.

Thus, there is a need for a vehicle component that solves, or at least alleviates, the foregoing problems. The manner of achieving these sometimes conflicting characteristics must be easily implemented and cost-effective.

DISCLOSURE OF INVENTION

In accordance with the invention, an ink-jet ink composition is provided which employs at least about 50 wt% of a perfluorinated solvent as the vehicle.

A perfluorinated solvent has several advantages over conventional solvents in a thermal ink-jet ink. First, perfluorinated solvent consists of small, oligomeric liquid Teflon™ chains and is chemically inert, and thus there will be few, if any, materials compatibility issues, even when the pen is stored at elevated temperatures. Second, because the perfluorinated solvent does not hydrogen-bond, very little paper or filler or sizer interaction from solvent will occur. Thus, cockle and curling problems associated with printing prior art inks on paper are solved and predictably, bleed and threading are minimized. (As used therein, "cockle" refers to the puck-ering, or crinkling, of the surface of the paper, generating a washboard-like surface texture when printed with an ink having a high water content. Cockle occurs during printing and can be severe enough to interfere with the printing process. "Curl" refers to the rolling up of paper into a scroll-like tube, which can take many days to develop). Furthermore, rapid dry times are observed, due to minimal paper/ink inter-action. Thus, several problems with thermal ink-jet inks are solved or are at least al-leviated.

A method of improving print quality by incorporating the perfluorinated solvent into an ink-jet composition is also provided. Since typical color ink-jet printers employ an ink set having at least three color inks and a single black ink, it is contemplated that any or all of the four inks may be formulated according to the present invention to achieve high quality printing.

The present ink-jet ink compositions and method of improving print quality provided herein may be used with a variety of ink-jet printers such as continuous, piezoelectric drop-on-demand printers and thermal or bubble jet drop-on-demand printers. Printing may be done on a variety of media; examples include paper, textiles, and transparencies. The improvement in print quality characteristics and dry time achieved in the practice of the invention enables ink-jet printers to effect high print quality in a cost-effective manner.

BRIEF DESCRIPTION OF THE DRAWINGS

The sole Figure, on coordinates of absorption (in arbitrary units) and wavelength (in nm) is a spectral plot of different concentrations of Reichardt's dye (2,6-diphenyl-4(2,4,6-triphenylpyridinio)-phenolate), illustrating the shift in $\lambda'$ (a shoulder or secondary peak) as a function of dye concentration.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

It is noted that the purity of all components employed in the practice of the invention is that employed in normal commercial practice for ink-jet printing. Weight percents represent percent of total ink-jet ink composition, unless otherwise indicated.

In accordance with the invention, improved print quality is achieved with ink-jet inks containing one or more perfluorinated solvents in the vehicle, either partially or totally. The concentration of the perfluorinated solvent may be in the range of about 50 to 100 wt % of the vehicle. The vehicle is then combined with the colorant and other additives, such as biocides, bleed control agents, decap (anti-crusting) agents, waterfastness agents, and the like. Such other additives are well-known in this art.

By adding one or more perfluorinated solvents to an ink-jet ink composition, both (1) reduction or elimination of materials compatibility issues and (2) reduction of interaction between the perfluorinated solvent and the print medium, specifically, paper, are simultaneously achieved. This latter improvement apparently results from the fact that the perfluorinated solvent does not hydrogen bond to the paper, and leads to a reduction in cockle and curling of the print medium. A further benefit of the lack of hydrogen bonding is the reduction of bleed and threading. (Threading is defined as the tendency of the colorant in the ink to follow the fibers of the paper, resulting in reduced optical density and reduced edge acuity of the ink.) Finally, because of minimal paper/fluid interaction, rapid dry times are obtained.

The perfluorinated solvents are either fluorohydrocarbons having the formula $$(R_1)\text{—}(CF_2)_n\text{—}(R_2),$$

where $R_1$ and $R_2$ are independently selected from the group consisting of —$CH_3$ and —$CF_3$ and where n is within the range of 5 to 100, or perfluoropolyethers, having the formula $$CF_3O[\text{—}CF(CF_3)CF_2O\text{—}]_x(\text{—}CF_2O\text{—})_yCF_3,$$

where x and y are integers, with x within the range of about 1 to 160 and y within the range of about 1 to 25. Examples of perfluorinated solvents include the following compounds:

TABLE I

EXAMPLES OF PERFLUORINATED COMPOUNDS

| TRADENAME | FORMULA |
|---|---|
| Fluorinert[1] FC-43 | $CF_3\text{—}(CF_2)_{10}\text{—}CF_3$ |
| Fluorinert[1] FC-70 | $CF_3\text{—}(CF_2)_{13}\text{—}CF_3$ |
| Fluorinert[1] FC-71 | $CH_3\text{—}(CF_2)_6\text{—}CF_3$ |
| Fluorinert[1] FC-75 | $CF_3\text{—}(CF_2)_6\text{—}CF_3$ |
| Fluorinert[1] FC-77 | $CH_3\text{—}(CF_2)_6\text{—}CH_3$ |
| Fluorinert[1] FC-84 | $CF_3\text{—}(CF_2)_5\text{—}CF_3$ |
| Fomblin[2] Y LVAC 06/6 | $CF_3O[\text{—}CF(CF_3)CF_2O\text{—}]_6(\text{—}CF_2O\text{—})_6CF_3$, M.W. = 1800 |
| Fomblin[2] Y LVAC 14/6 | $CF_3O[\text{—}CF(CF_3)CF_2O\text{—}]_{14}(\text{—}CF_2O\text{—})_6CF_3$, M.W. = 2500 |
| Fomblin[2] Y LVAC 16/6 | $CF_3O[\text{—}CF(CF_3)CF_2O\text{—}]_{16}(\text{—}CF_2O\text{—})_6CF_3$, M.W. = 2700 |
| Fomblin[2] Y LVAC 25/6 | $CF_3O[\text{—}CF(CF_3)CF_2O\text{—}]_{25}(\text{—}CF_2O\text{—})_6CF_3$, M.W. = 3300 |
| Fomblin[2] Y HVAC 18/8 | $CF_3O[\text{—}CF(CF_3)CF_2O\text{—}]_{18}(\text{—}CF_2O\text{—})_8CF_3$, M.W. = 2800 |
| Fomblin[2] Y HVAC 25/9 | $CF_3O[\text{—}CF(CF_3)CF_2O\text{—}]_{25}(\text{—}CF_2O\text{—})_9CF_3$, M.W. = 3300 |
| Fomblin[2] Y HVAC 40/11 | $CF_3O[\text{—}CF(CF_3)CF_2O\text{—}]_{40}(\text{—}CF_2O\text{—})_{11}CF_3$, M.W. = 3900 |
| Fomblin[2] Y HAVAC 140/13 | $CF_3O[\text{—}CF(CF_3)CF_2O\text{—}]_{140}(\text{—}CF_2O\text{—})_{13}CF_3$, M.W. = 6500 |

Notes:
[1] Fluorinert is a trademark of 3M Co. (Minneapolis, MN)
[2] Fomblin is a trademark of Ausimont, (Morristown, NJ); M.W. = average molecular weight, as provided by Aldrich Chemical.

Inks containing perfluorinated solvents are found to evidence bleed and require the use of surfactants, amphiphiles, and detergents to reduce this printing defect. Perfluorinated solvents do, however, support inverted micelles, which associate with the colorant (dye, pigment, or MMC), and it is anticipated that these inverted micelles can inhibit bleed much the same way as do micelles in aqueous systems.

Inks suitable for ink-jet printing typically comprise a vehicle, one or more colorants, and, optionally, one or more additives, as indicated above. The inks of the present invention, which include perfluorinated solvents, comprise about 90 to 99.9 wt % vehicle and about 0.1 to 10 wt % colorant (dye, pigment, or macromolecular chromophore). As stated above, the perfluorinated solvent must be present in amount of at least 50 wt % of the total amount of vehicle. Preferably, the vehicle comprises at least 90 wt % of the perfluorinated solvent, and most preferably at least 95 wt %. The vehicle may additionally include up to 1 wt % of one or more polyols (co-solvents). A driver component is added to assist in bubble nucleation to jet the ink in thermal ink-jet printing. The driver component is a small molecule, such as water or acetonitrile, and the vehicle may contain up to 2 wt % water and up to 2 wt % acetonitrile. Further, about 5 to 50 wt % of the vehicle may comprise a functionalized perfluorinated compound, which serves to act as a humectant and as a means for maintaining a constant pH. Such functionalized perfluorinated compounds include alcohols, carboxylic acids, and esters. Examples of three such functionalized perfluorinated compounds useful in the practice of the present invention are listed in Table II below.

TABLE II

EXAMPLES OF FUNCTIONALIZED PERFLUORINATED COMPOUNDS

| TRADENAME | FORMULA |
|---|---|
| Fomblin[2] Z-DOL | $HOCH_2\text{—}(CF_2)_m\text{—}CH_2OH$, m > 10 |

TABLE II-continued

EXAMPLES OF FUNCTIONALIZED
PERFLUORINATED COMPOUNDS

| TRADENAME | FORMULA |
|---|---|
| Fomblin²Z-DIAC | HOOC—(CF$_2$)$_m$—COOH, m > 10 |
| Fomblin²Z-DEAL | H$_3$COOC—(CF$_2$)$_m$—COOCH$_3$, m > 10 |

It is contemplated that any colorant, whether dye or pigment or macromolecular choromophore, that is compatible with the remaining components of the ink-jet ink composition may be employed in the practice of the invention. Preferably, the colorant is a water-soluble dye in the practice of the invention and is employed within the range of about 0.1 to 10 wt % of the ink-jet ink composition. Advantageously, a black colorant is employed in the range of about 2 to 5 wt %; a yellow colorant is employed in the range of about 0.4 to 3 wt %; a blue colorant for a cyan ink is employed in the range of about 1.5 to 4 wt %; and a red colorant for a magenta ink is employed in the range of about 1 to 4.5 wt %. In the selection of a particular colorant, it is important to understand that inks formulated in accordance with the invention remain on the surface of the print medium.

Any of the sulfonate and carboxylate dyes used in ink-jet printing are suitably employed in the practice of the invention, as are any of the pigments used in ink-jet printing.

Consistent with the requirements for this invention, various types of other additives may be employed in the ink to optimize the properties of the ink composition for specific applications. For example, as is well-known to those skilled in the art, one or more biocides, fungicides, and/or slimicides (microbial agents) may be used in the ink composition as is commonly practiced in the art. Any of the biocides commonly employed in ink-jet inks may be employed in the practice of the invention, such as NUOSEPT 95, available from Huls America (Piscataway, N.J.); PROXEL GXL, available from ICI America (Wilmington, Del.); and glutaraldehyde, available from Union Carbide Company (Bound Brook, N.J.) under the trade designation UCAR-CIDE 250. PROXEL GXL is the preferred biocide. Additionally, sequestering agents such as EDTA may be included to eliminate deleterious effects of heavy metal impurities, and buffer solutions may be used to control the pH of the ink. Other known additives such as viscosity modifiers and/or other acrylic or non-acrylic polymers may be added to improve various properties of the ink compositions as desired.

One issue that remains regards the jetting of the ink which include the perfluorinated solvent(s) from the pen. The perfluorinated solvents have a high molecular weight compared to typical ink-jet ink solvents and thus require a larger mass to "boil" on the resistor surface to generate the same sized vapor bubble that a small amount of aqueous solvent does. Thus, a new pen design with a hotter resistor is needed to jet the same amount of ink. The driver component discussed above is used to aid in the jetting of the ink.

Another issue that remains is the development of colorants designed for use with these perfluorinated solvents such that they are soluble in this liquid. However, water in oil microemulsions may be employed that utilize existing colorants.

With regard to microemulsions, one preferred microemulsion based on Fomblin™ and Fluorinert™ solvents comprises
1.5% CH$_3$CN,
40% Fomblin™ Z-DOL,
57.5% FC-75, and
1% Reichardt's dye (2,6-diphenyl-4(2, 4, 6-triphenylpyridinio)-phenolate). Reichardt's dye has the formula shown below:

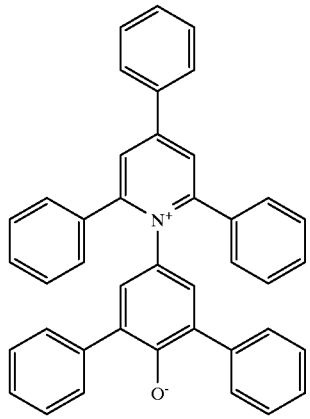

The sole Figure shows that in increasing the concentration of Reichardt's dye is increased, the chemical environment around the dye also changes (as shown by the shift in λ', which is a shoulder or secondary peak). The value of λ' at a concentration of 0.025 wt % (Curve 10) is 340 nm, while the value of λ' at a concentration of 0.05 wt % (Curve 12) is 350 nm and at 0.1 wt % (Curve 14) is 500 nm. Thus, as the concentration of Reichardt's dye varies, broadening in the 300 to 400 nm region occurs, and, at higher concentrations (0.1 wt %), a secondary peak (at 500 nm) appears. As the dye concentration increases, shifts in the wavelength spectrum occur. This gives and alteration of the observed color of Reichardt's dye with its concentration and this phenomenon presumably indicates inverse micelle formaion involving Reichardt's dye.

Without subscribing to any particular theory, it appears that the shift in λ' could be due to dye aggregation, H-bonding or both.

Another preferred microemulsion based on Fomblin™ and Fluorinert™ comprises
1.5% CH$_3$CN,
40% Fomblin™ Z-DOL,
57.5% FC-75, and
1.0% 4-[(1-methyl-4(1H)-pyridinylene]-2,5-cyclohexadien-1-one (MPEC).
MPEC has the formula shown below.

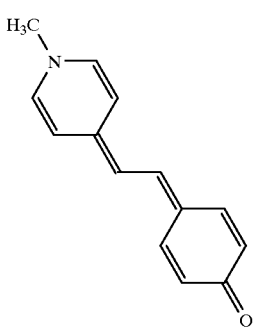

The two dyes described above (Reichardt's dye and MPEC) represent the first inks made using perfluorinated solvents as the vehicle. The inks were prepared by combining the acetonitrile and the dye first, then adding the combination to the perfluorinated compounds with stirring.

Additional benefits of increasing the tendency of the ink to remain on the surface of the print medium are fast dry times and reduced paper cockle. It is conjectured that, since the present perfluorinated-containing inks tend to remain on the surface of the print medium, the ink vehicles have greater exposure to the atmosphere and to evaporative forces, thereby enhancing dry time. Dry time is facilitated by the lack of interaction of the perfluorinated solvent with the print medium. Dry time is typically about one to two seconds in the practice of the invention, except in heavy graphic areas with secondary colors, in which the dry time will be less that about five seconds. In contrast, the dry times of prior art inks that do not incorporate the perfluorinated solvents disclosed herein is in excess of ten seconds. The occurrence of paper cockle is decreased, since the ink vehicle does not substantially invade paper fibers.

The use of one or more perfluorinated solvents in the vehicle is contemplated to replace the more conventional aqueous-based ink-jet composition, but the invention is not so limited. While vehicles comprising 100 wt % perfluorinated solvent(s) are preferred, the present invention also contemplates pairing the benefits of the perfluorinated solvent(s) with those of employing a humectant compound as an additional solvent, alone or in conjunction with the functionalized perfluorinated solvents discussed above. Examples of suitable humectants include, but are not limited to, polyols (particularly diols, a.k.a. glycols) and glycol ethers. Examples of glycols include, but are not limited to, glycols such as ethylene glycol, diethylene glycol, triethylene glycol, tetraethylene glycol, propylene glycol, polyethylene glycol, polypropylene glycol, thioglycol, and derivatives thereof, and diols such as propanediol, butanediol, pentanediol, hexanediol, and homologous diols. Additional co-solvents may also be employed, such as glycol esters; long chain alcohols such as butyl alcohol, pentyl alcohol, and homologous alcohols; and other low vapor pressure, water-miscible solvents such as esters; ketones; lactones such as γ-butyrolactone; lactams such as N-pyrrolidone, 2-pyrrolidone, and N-(2-hydroxyethyl) pyrrolidone; and glycerols and their derivatives. The concentration of these humectants and cosolvents may range up to 1 wt % of the vehicle.

Finally, one or more surfactants, specifically, non-ionic and zwitterionic, may be employed in the practice of the present invention. Examples of non-ionic surfactants that may be beneficially employed in the practice of the present invention include: TERGITOLs, which are polyethylene or polypropylene oxide ethers; TRITONs, which are alkyl phenyl polyethylene oxide surfactants available from Rohm & Haas Co.; BRIJs, which are polyethylene or polypropylene oxide ethers; PLURONICs, which are also polyethylene or polypropylene oxide ethers; and the SURFYNOLs, which are acetylenic ethylene oxides; polyethylene oxide (POE) esters; POE diesters; POE amines; protonated POE amines; POE amides; the polypropylene analogs of the foregoing POE compounds; and dimethicone copolyols. Examples of zwitterionic surfactants that may be beneficially employed in the practice of the present invention include amphiphilic amine oxides having the formula

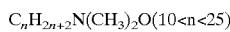

and the betaines, which have the general formula:

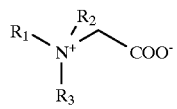

where $R_1$, $R_2$, and $R_3$ are each in the range of 10 to 23 carbon atoms. $R_1$, $R_2$, and $R_3$ may be the same or different.

Examples of amine oxides include N,N-dimethyl-N-(Z-9-octa-decenyl)-N-amine oxide (OOAO), N,N-dimethyl-N-dodecyl amine oxide (NDAO), isostearamidopropylamine oxide; isostearamidopropyl morpholine oxide; lauramine oxide; myristamine oxide; cetamine oxide; minkamidopropylamine oxide; oleamidopropylarnine oxide; oleyl dimethyl amine oxide; olivamidopropyl amine oxide; stearamine oxide; sesamidopropylamine oxide; and wheat germamidopropylamine oxide.

The surfactant, if employed, is within the range of about 0.01 to 1 wt % and preferably is within the range of about 0.3 to 0.1 wt %.

The formulation of the present ink-jet inks does not require special measures. Rather, the various components disclosed above are simply added together and mixed until a uniform solution is achieved.

Thus, the addition of one or more perfluorinated solvents to ink-jet inks improves materials compatibility, reduces cockle and curling, reduces bleed and reduces dry time.

INDUSTRIAL APPLICABILITY

The present ink-jet ink compositions and method of improving print quality by increasing bleed control, while decreasing paper cockle, paper curl, dry time and minimizing materials compatibility concerns as disclosed herein, are expected to find commercial use in ink-jet printing.

Thus, there has been disclosed an ink-jet ink composition and a method of printing which result in improved print quality with the incorporation of a perfluorinated solvent as partial or total replacement of the vehicle co-solvent. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink composition for ink-jet printing comprising at least one colorant and a vehicle, said vehicle including at least 50 wt % of at least one perfluorinated solvent wherein said at least one perfluorinated solvent comprises either a fluorohydrocarbon having the formula

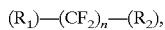

where $R_1$ and $R_2$ are independently selected from the group consisting of $-CH_3$ and $-CF_3$ and where n is within the range of 5 to 100, or perfluoropolyethers, having the formula

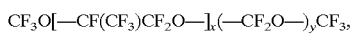

where x is an integer within a range of 1 to 160 and y is an integer within a range of 1 to 25.

2. The ink-jet ink composition of claim 1 wherein said at least one perfluorinated solvent is selected from the group consisting of $CF_3-(CF_2)_{10}-CF_3$, $CF_3-(CF_2)_{13}-CF_3$, $CH_3-(CF_2)_6-CF_3$, $CF_3-(CF_2)_6-CF_3$, $CH_3-(CF_2)_6-CH_3$, $CF_3-(CF_2)_5-CF_3$, $CF_3O[-CF-(CF_3)CF_2O-]_6$ $(-CF_2O-)_6CF_3$, $CF_3O[-CF(CF_3)CF_2O-]_{14}(-CF_2O-)_6CF_3$, $CF_3O[-CF(CF_3)-CF_2O-]_{16}(-CF_2O-)_6CF_3$, $CF_3O[-CF(CF_3)CF_2O-]_{25}(-CF_2O-)_6CF_3$, $CF_3O[-CF-(CF_3)CF_2-O-]_{18}(-CF_2O-)_8CF_3$, $CF_3O[-CF(CF_3)CF_2O-]_{25}(-CF_2O-)_9CF_3$, $CF_3O[-CF-(CF_3)CF_2O-]_{40}(-CF_2O-)_{11}CF_3$, and $CF_3O[-CF(CF_3)CF_2O-]_{140}(-CF_2O-)_{13}CF_3$.

3. The ink-jet ink composition of claim 1 wherein said colorant is selected from the group consisting of dyes, pigments, and macromolecular chromophores.

4. The ink-jet ink composition of claim 3 wherein said colorant is selected from the group consisting of (2,6-diphenyl-4(2, 4, 6-triphenylpyridinio)-phenolate) and 4-[(1-methyl-4(1H)-pyridinylene]-2,5 -cyclohexadien-1-one.

5. The ink-jet ink composition of claim 1 wherein said vehicle further includes up to about 4 wt % of a driver component to assist in jetting said ink from a printer.

6. The ink-jet ink composition of claim 5 wherein said driver component is selected from the group consisting of up to about 2 wt % water, up to about 2 wt % acetonitrile, and mixtures thereof.

7. The ink-jet ink composition of claim 1 wherein said vehicle further includes up to about 1 wt % of at least one humectant selected from the group consisting of polyols and glycol ethers and, optionally, at least one co-solvent selected from the group consisting of glycol esters, long chain alcohols, esters, ketones, lactones, lactams, and glycerols, and their derivatives.

8. An ink-jet ink composition for ink-jet printing comprising at least one colorant and a vehicle, said vehicle including at least 90 wt % of at least one perfluorinated solvent.

9. The ink-jet ink composition of claim 8 wherein said vehicle includes at least 95 wt % of said at least one perfluorinated solvent.

10. The ink-jet ink composition of claim 8 wherein said vehicle further includes up to about 1 wt % of at least one humectant selected from the group consisting of polyols and glycol ethers and, optionally, at least one co-solvent selected from the group consisting of glycol esters, long chain alcohols, esters, ketones, lactones, lactams, and glycerols, and their derivatives.

11. An ink-jet ink composition for ink-jet printing comprising at least one colorant and a vehicle, said vehicle including at least 50 wt % of at least one perfluorinated solvent wherein said vehicle further includes from about 5 to 50 wt % of a functionalized perfluorinated compound, which serves to act as a humectant and as a means for maintaining a constant pH.

12. The ink-jet ink composition of claim 11 wherein said functionalized perfluorinated compound includes at least one functional group selected from the group consisting of alcohols, carboxylic acids, and esters.

13. The ink-jet ink composition of claim 12 wherein said finctionalized perfluorinated compound is selected from the group consisting of $HOCH_2-(CF_2)_m-CH_2OH$, $HOOC-(CF_2)_m-COOH$, and $H_3COOC-(CF_2)_m-COOCH_3$, where m>10.

14. An ink-jet ink composition for ink-jet printing comprising:
(a) about 0.1 to 10 wt % of a colorant; and
(b) about 90 to 99.9 wt % of a perfluorinated solvent.

15. The ink-jet ink composition of claim 14 comprising:
(a) about 1 wt % 2,6-diphenyl-4(2, 4, 6-triphenylpyridinio)-phenolate;
(b) about 1.5% $CH_3CN$;
(c) about 40% $HOCH_2-(CF_2)_m-CH_2OH$, where m>10; and
(d) about 57.5% $CF_3-(CF_2)_6-CF_3$.

16. The ink-jet ink composition of claim 14 comprising:
(a) about 1.0% 4-[(1-methyl-4(1H)-pyridinylene]-2,5-cyclohexadien-1-one;
(b) about 1.5% $CH_3CN$;
(c) about 40% $HOCH_2-(CF_2)_m-CH_2OH$, where m>10; and
(d) about 57.5% $CF_3-(CF_2)_6-CF_3$.

17. A method of increasing bleed control between adjacent colors, reducing cockle and curling, and decreasing dry time of an ink-jet ink for ink-jet printing, said ink-jet ink comprising at least one colorant and a vehicle, said method comprising incorporating at least 50 wt % of at least one perfluorinated solvent into said vehicle to form an improved vehicle wherein said at least one perfluorinated solvent comprises either a fluorohydrocarbon having the formula

where $R_1$ and $R_2$ are independently selected from the group consisting of $-CH_3$ and $-CF_3$ and where n is within the range of 5 to 100, or perfluoropolyethers, having the formula

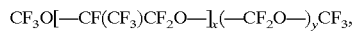

where x is an integer within a range of 1 to 160 and y is an integer within a range of 1 to 25.

18. The method of claim 17 wherein said at least one perfluorinated solvent is selected from the group consisting of $CF_3-(CF_2)_{10}-CF_3$, $CF_3-(CF_2)_{13}-CF_3$, $CH_3-(CF_2)_6-CF_3$, $CH_3-(CF_2)_6-CF_3$, $CH_3-(CF_2)_6-CH_3$, $CF_3-(CF_2)_5-CF_3$, $CF_3O[-CF(CF_3)CF_2O-]_6(-CF_2-O-)_6CF_3$, $CF_3O[-CF(CF_3)CF_2O-]_{14}(-CF_2O-)_6CF_3$, $CF_3O[-CF-(CF_3)CF_2O-]_{16}(-CF_2O-)_6-CF_3$, $CF_3O[-CF(CF_3)CF_2O-]_{25}(-CF_2O-)_6CF_3$, $CF_3O[-CF-(CF_3)CF_2O-]_{18}(-CF_2O-)_8CF_3$, $CF_3O[-CF(CF_3)CF_2O-]_{25}(-CF_2O-)_9CF_3$, $CF_3O[-CF-(CF_3)CF_2O-]_{40}(-CF_2O-)_{11}CF_3$, and $CF_3O[-CF(CF_3)CF_2O-]_{140}(-CF_2O-)_{13}CF_3$.

19. The method of claim 17 wherein said colorant is selected from the group consisting of dyes, pigments, and macromolecular chromophores.

20. The method of claim 19 wherein said colorant is selected from the group consisting of (2,6-diphenyl-4(2, 4, 6-triphenylpyridinio)-phenolate) and 4-[(1-methyl-4(1H)-pyridinylene]-2,5-cyclohexadien-1-one.

21. The method of claim 17 wherein said vehicle further includes up to about 4 wt % of a driver component to assist in jetting said ink from a printer.

22. The method of claim 21 wherein said driver component is selected from the group consisting of up to about 2 wt % water, up to about 2 wt % acetonitrile, and mixtures thereof.

23. The method of claim 17 wherein said vehicle further includes up to about 1 wt % of at least one humectant selected from the group consisting of polyols and glycol ethers and, optionally, at least one co-solvent selected from the group consisting of glycol esters, long chain alcohols, esters, ketones, lactones, lactams, and glycerols, and their derivatives.

24. A method of increasing bleed control between adjacent colors, reducing cockle and curling, and decreasing dry time of an ink-jet ink for ink-jet printing, said ink-jet ink comprising at least one colorant and a vehicle, said method comprising incorporating at least 90 wt % of at least one perfluorinated solvent into said vehicle to form an improved vehicle.

25. The method of claim 24 wherein said vehicle includes at least 95 wt % of said at least one perfluorinated solvent.

26. A method of increasing bleed control between adjacent colors, reducing cockle and curling, and decreasing dry time of an ink-jet ink for ink-jet printing, said ink-jet ink comprising at least one colorant and a vehicle, said method comprising incorporating at least 50 wt % of at least one perfluorinated solvent and from about 5 to 50 wt % of a functionalized perfluorinated compound, which serves to act as a humectant and as a means for maintaining a constant pH into said vehicle to form an improved vehicle.

27. The method of claim 26 wherein said finctionalized perfluorinated compound includes at least one functional group selected from the group consisting of alcohols, carboxylic acids, and esters.

28. The method of claim 27 wherein said fiuctionalized perfluorinated compound is selected from the group consisting of $HOCH_2-(CF_2)_m-CH_2OH$, $HOOC-(CF_2)_m-COOH$, and $H_3COOC-(CF_2)_m-COOCH_3$, where $m>10$.

29. A method of increasing bleed control between adjacent colors, reducing cockle and curling, and decreasing dry time of an ink-jet ink for ink-jet printing, said method comprises incorporating from about 0.1 to 10 wt % of a colorant and from about 90 to about 99.9 wt % of a perfluorinated solvent into said ink-jet ink to form an improved ink-jet ink.

30. The method of claim 29 wherein said ink comprises:
(a) about 1 wt % 2,6-diphenyl-4(2,4,6-triphenylpyridinio)-phenolate;
(b) about 1.5% $CH_3CN$;
(c) about 40% $HOCH_2-(CF_2)_m-CH_2OH$, where $m>10$; and
(d) about 57.5% $CF_3-(CF_2)_6-CF_3$.

31. The method of claim 29 wherein said ink comprises:
(a) about 1.0% 4-[(1-methyl-4(1H)-pyridinylene]-2,5-cyclohexadien-1-one;
(b) about 1.5% $CH_3CN$;
(c) about 40% $HOCH_2-(CF_2)_m-CH_2OH$, where $m>10$; and
(d) about 57.5% $CF_3-(CF_2)_6-CF_3$.

* * * * *

UNITED STATES PATENT AND TRADEMARK OFFICE
CERTIFICATE OF CORRECTION

PATENT NO.    : 5,919,293                                     Page 1 of 1
DATED         : July 6, 1999
INVENTOR(S)   : John R. Moffatt et al.

It is certified that error appears in the above-identified patent and that said Letters Patent is hereby corrected as shown below:

Column 9,
Line 55, "finctionalized" should read -- functionalized --;

Column 11,
Lines 12 and 16, "finctionalized" should read -- functionalized --.

Signed and Sealed this

Fifteenth Day of April, 2003

JAMES E. ROGAN
*Director of the United States Patent and Trademark Office*